United States Patent
Liang et al.

(10) Patent No.: US 8,373,975 B2
(45) Date of Patent: Feb. 12, 2013

(54) PROTECTIVE COVER, KEY ASSEMBLY USING THE SAME AND PORTABLE ELECTRONIC DEVICE USING THE KEY ASSEMBLY

(75) Inventors: Shi-Xu Liang, Shenzhen (CN); Jun-Lin Chen, Shenzhen (CN); Yung-Chang Yen, Taipei Hsien (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 229 days.

(21) Appl. No.: 12/884,227

(22) Filed: Sep. 17, 2010

(65) Prior Publication Data

US 2011/0228493 A1 Sep. 22, 2011

(30) Foreign Application Priority Data

Mar. 16, 2010 (CN) .......................... 2010 1 0124904

(51) Int. Cl.
*G06F 1/16* (2006.01)
*H05K 5/00* (2006.01)
*H04M 1/00* (2006.01)
*H04M 9/00* (2006.01)
*H04B 1/08* (2006.01)
*H01H 3/12* (2006.01)
*H01H 13/14* (2006.01)

(52) U.S. Cl. ........... 361/679.02; 361/679.56; 455/575.8; 455/550.1; 455/347

(58) Field of Classification Search .................. 361/728, 361/729, 730, 732, 736, 752, 807, 809, 810, 361/837, 679.56; 200/293, 318, 329, 339, 200/318.1, 318.2, 5 R, 275, 296, 302.3, 320, 200/330, 341–345, 517, 520, 536, 547, 550, 200/553; 455/575.1, 575.2, 575.3, 575.8, 455/550.1, 347; 379/422
See application file for complete search history.

(56) References Cited

U.S. PATENT DOCUMENTS

| | | | | |
|---|---|---|---|---|
| 6,148,183 A * | 11/2000 | Higdon et al. | ............. | 455/575.1 |
| 7,595,712 B2 * | 9/2009 | Nishino et al. | ................ | 335/207 |
| 8,089,772 B2 * | 1/2012 | Chen | ............................. | 361/752 |
| 2009/0159416 A1 * | 6/2009 | Tseng et al. | .................. | 200/341 |
| 2011/0226599 A1 * | 9/2011 | Xiao | ............................. | 200/341 |

* cited by examiner

*Primary Examiner* — Zachary M Pape
*Assistant Examiner* — Binh Tran
(74) *Attorney, Agent, or Firm* — Altis Law Group, Inc.

(57) ABSTRACT

A protective cover includes a cover body and a pressing body integrally mounted to the cover body. The cover body has an accommodating cavity recessed from a surface of the cover body and an accommodating hole defined through the base wall of the accommodating cavity. The pressing body is mounted to the cover body and includes a pressing portion and a resisting post. The pressing portion is configured for being received within the accommodating cavity and exposed from the accommodating hole. The resisting post protruding from a surface of the pressing portion away from the cover body corresponding to the switch. There also discloses a key assembly using the protective cover and a portable electronic device using the key assembly.

11 Claims, 5 Drawing Sheets

PROTECTIVE COVER, KEY ASSEMBLY USING THE SAME AND PORTABLE ELECTRONIC DEVICE USING THE KEY ASSEMBLY

BACKGROUND

1. Technical Field

The exemplary disclosure generally relates to protective covers with key assemblies using the same and portable electronic devices using the key assemblies.

2. Description of Related Art

With the functions of the portable electronic devices such as mobile phones, and personal digital assistants (PDAs) increasing, these portable electronic devices often have functional keys on their side walls (namely side keys) for facilitating users in operation. An existing side key assembly typically includes a side key exposed to the outside of the portable electronic device and a switch assembled within the portable electronic device corresponding to the side key.

However, when the aforementioned side key assembly is mounted to a battery cover of the portable electronic device, the user often needs to detach the battery cover from the portable electronic device for exchanging the battery. Thus, the corresponding switch of the side key assembly may often be exposed, and may be wrongly pressed and damaged when the battery cover is assembled or is detached.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the exemplary protective cover, key assembly using the same and portable electronic device using the key assembly. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
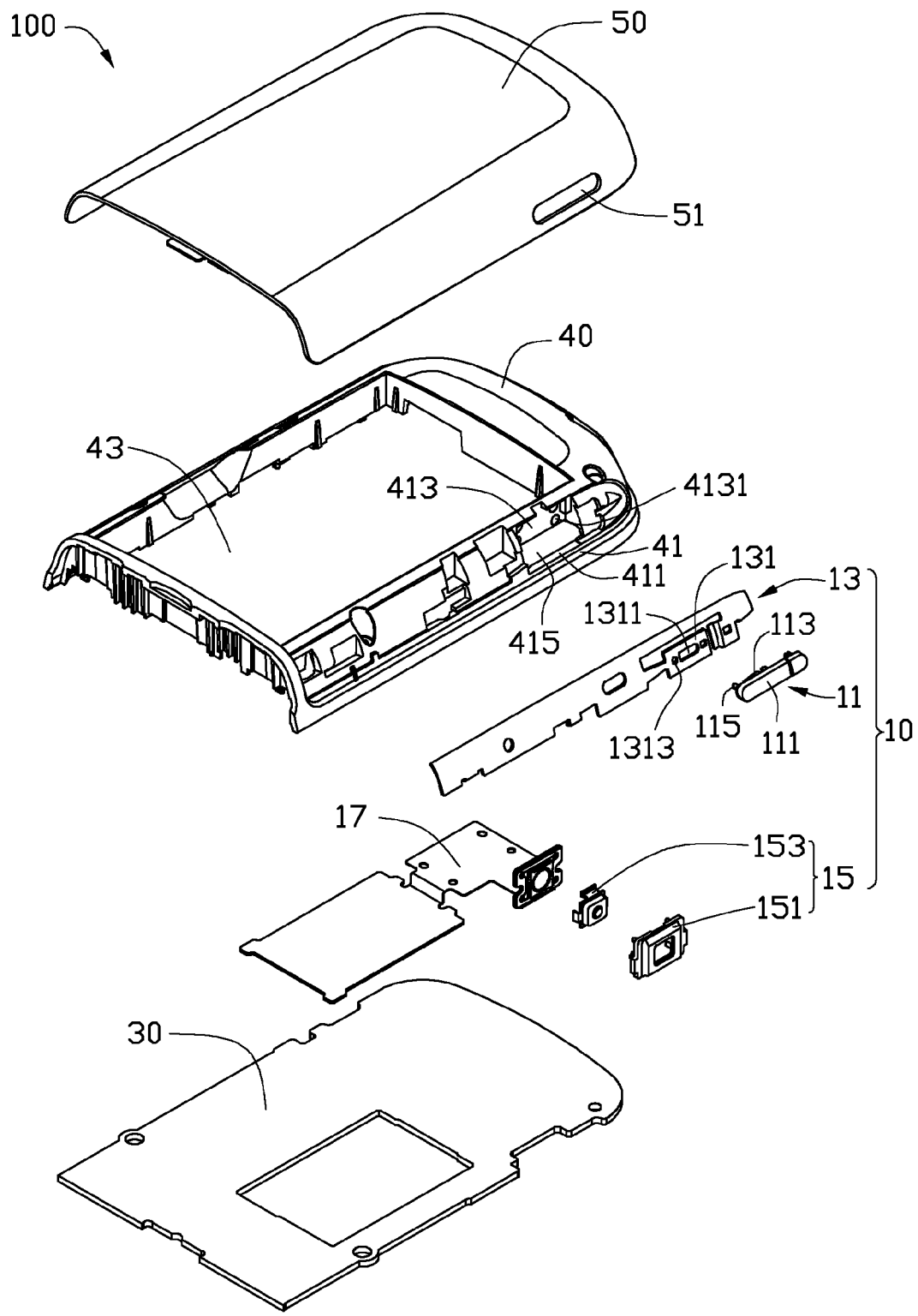
FIG. 1 is a disassembled perspective view of an exemplary embodiment of a portable electronic device including a key assembly.

Referring to FIG. 1, a disassembled perspective view of an exemplary embodiment of a portable electronic device 100 including a key assembly 10 is shown. The portable electronic device 100 described here may be a mobile phone, an MP3 or a personal digital assistant (PDA). The portable electronic device 100 includes a key assembly 10, a circuit board 30, a housing 40 and a battery cover 50.

The key assembly 10 includes a key 11, an elastic sheet 13, a protective cover 15 and a switch module 17. The key 11 and the elastic sheet 13 both are mounted to the battery cover 50. The protective cover 15 and the switch module 17 both are assembled to the housing 40 corresponding to the key 11. The key 11 includes a key body 111, a resisting block 113, and at least one assembly post 115. The resisting block 113 is substantially rectangular block shaped and protrudes from the key body 111. In the exemplary embodiment, there are two assembly posts 115 protruding from the key body 111. The two assembly posts 115 fix the key 11 to the elastic sheet 13. The resisting block 113 is located between the two assembly posts 115.

The elastic sheet 13 is mounted to the battery cover 15 together with the key 11. The elastic sheet 13 includes an elastic arm 131 extending therefrom corresponding to the key 11 and provides an elastic returning force to the key 11. A through hole 1311 and at least one assembly hole 1313 are defined through the elastic arm 131 corresponding to the resisting block 113 and the at least one assembly post 115. The resisting block 113 correspondingly passes through the through hole 1311 and resists against the protective cover 15. The at least one assembly post 115 passes through the corresponding assembly hole 1313 and is fixed to the elastic arm 13 by hot melt technology. In the exemplary embodiment, there are two assembly holes 1313 defined through the elastic arm 131 at opposite sides of the through hole 1311.

Figure 2:
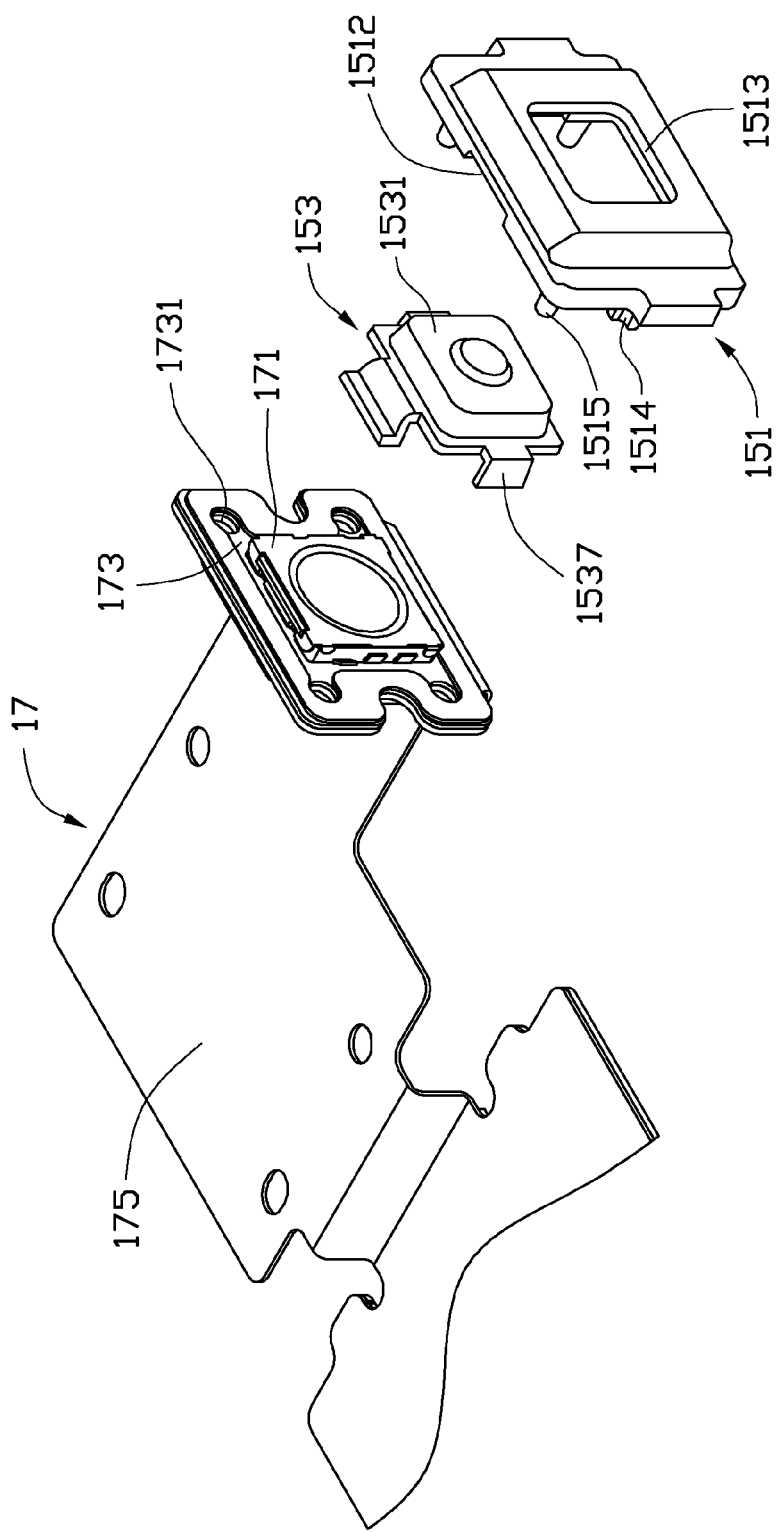
FIG. 2 is an exploded perspective view of a key assembly of the portable electronic device shown in FIG. 1.
Figure 3:
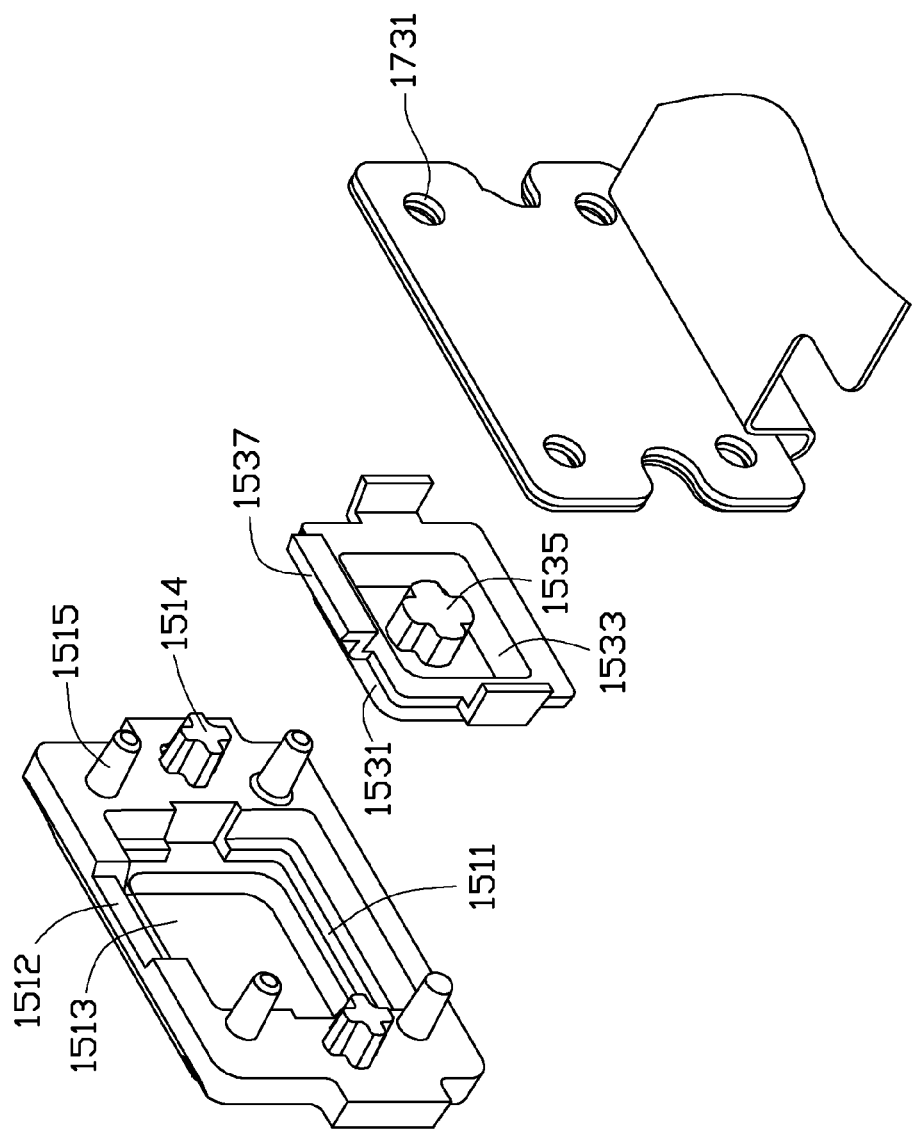
FIG. 3 is similar to FIG. 2, but viewed from another aspect.

Also referring to FIGS. 2 and 3, the protective cover 15 includes a cover body 151 and a pressing body 153 integrally assembled with the cover body 151. The cover body 151 can be a substantially rectangular shield having an accommodating cavity 1511 recessed from an inner surface of the cover body 151. The accommodating cavity 1511 has a shape and size corresponding to the shape and size of the pressing body 153 for receiving the pressing body 153. At least one gap 1512 is defined in the inner surface of the cover body 151, communicating with the accommodating cavity 1511 and partially receiving the pressing body 153. In the exemplary embodiment, there are three gaps 1512 defined in the inner surface, surrounding the accommodating cavity 1511. An accommodating hole 1513 is defined through an opposite outer surface of the cover body 151, communicating with the accommodating cavity 1511, exposing the pressing body 153 therefrom. Two assembly posts 1514 and at least one hot melt post 1515 protrude from the inner surface of the cover body 151. The two assembly posts 1514 can fix the protective cover 15 to the housing 40. The at least one hot melt post 1515 can fix the protective cover 15 with the switch module 17. In the exemplary embodiment, there are four hot melt posts 1515 protruding from the cover body 151 respectively positioned at four corners of the inner surface. The two assembly posts 1514 are located at opposite sides of the accommodating cavity 1511 respectively positioned between two hot melt posts 1515.

The pressing body 153 includes a pressing portion 1531 and an accommodating chamber 1533 recessed from the inner surface of the pressing portion 1531. The pressing portion 1531 corresponds to the accommodating hole 1513 of the cover body 151. A resisting post 1535 protrudes from the bottom of the accommodating chamber 1533 corresponding to the switch module 17. At least one lug 1537 protrudes from the periphery of the pressing portion 1531 corresponding to the at least one gap 1512 of the cover body 151. In the exemplary embodiment, there are three lugs 1537 protruding from the corresponding three edges of the periphery of the pressing portion 1531. During assembly, the pressing portion 1531 passes through the accommodating hole 1513 and is exposed from the outer surface of the cover body 151. The lugs 1537 of the pressing body 153 latch into the corresponding gaps 1512 of the cover body 151, such that, the pressing body 153 is assembled with the cover body 151. Alternately, the cover body 151 and the pressing body 153 can be integrally made by double-colored injection molding technology.

The cover body 151 is preferably made of rigid plastic material such as polycarbonate. The pressing body 153 is preferably made of elastic material such as thermoplastic polyurethane for providing an elastic force enabling the cover body 151 to rebound back to its original position, as the pressing body 153 is pressed toward the switch module 17.

The switch module 17 is assembled within the housing 40 together with the circuit board 30 and electrically connects with the circuit board 30. The switch module 17 includes a switch 171, a connecting sheet 173 and a flexible printed circuit board 175. The switch 171 is mounted on the connecting sheet 173 and electrically connects with the flexible printed circuit board 175 by the connecting sheet 173. The flexible printed circuit board 175 electrically connects with the circuit board 30, in such a way that, as the switch 171 is pressed in use, an electric controlling signal is generated for controlling the portable electronic device 100. The connecting sheet 173 defines at least one hot melt hole 1731 therethrough corresponding to the at least one hot melt post 1515 of the protective cover 15. The hot melt post 1515 passes through and can be fixed to the hot melt hole 1731 by hot melt technology, such that, the protective cover 15 and the switch module 17 are fixed to each other. In the exemplary embodiment, four hot melt holes 1731 are defined in the connecting sheet 23. The circuit board 30 is a printed circuit board assembled within the housing 40.

The housing includes a side wall 41 and defines an assembly slot 43 for receiving the circuit board 30 and the flexible printed circuit board 175 therein. The side wall 41 is positioned at one side of the assembly slot 43. An assembly groove 411 is recessed in the side wall 41, thereby forming a side groove wall 413. A guide hole 415 is defined through a bottom of the assembly groove 411 communicating with the assembly slot 43. The assembly groove 411 assembles the switch 171 and the protective cover 15 in the assembly groove 411. Two mounting holes 4131 are defined through the side groove wall 413 corresponding to the two assembly posts 1514 of the protective cover 15 assembles the protective cover 15 and switch 171 to the housing 40. The battery cover 50 is detachably mounted to the housing 40 and defines a key hole 51 therethrough corresponding to the key 11.

Figure 4:
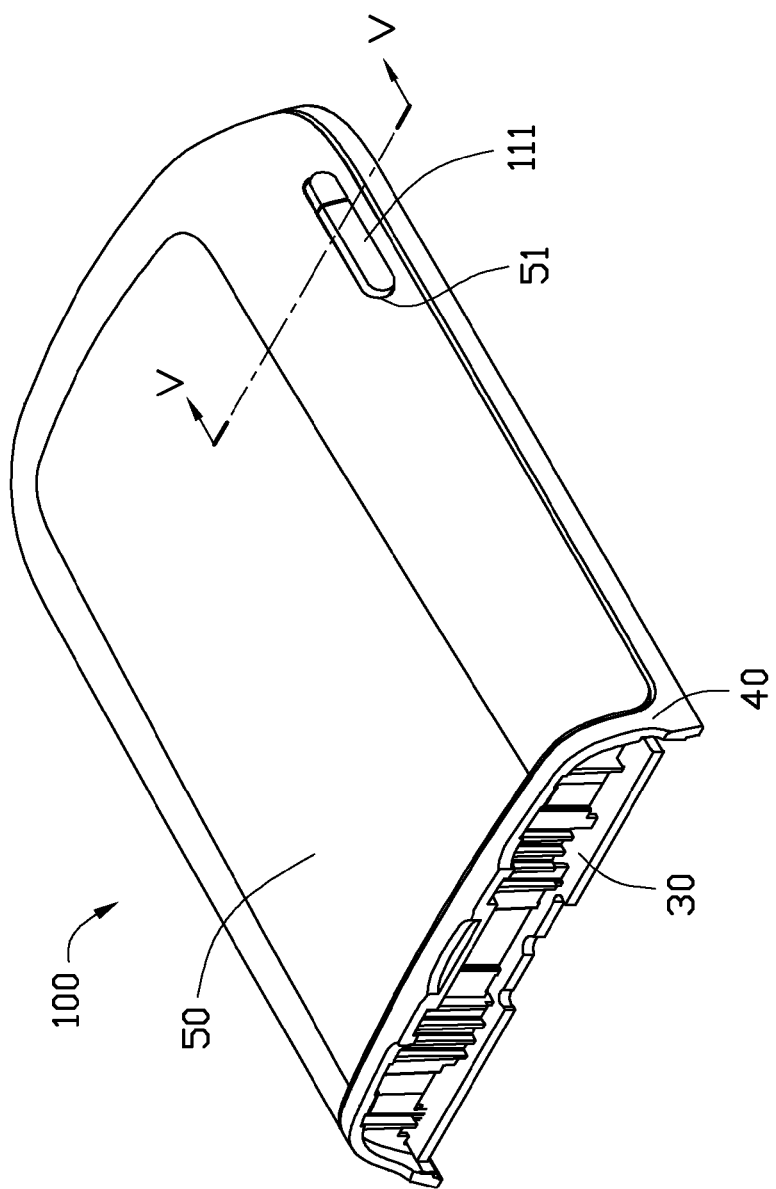
FIG. 4 is an assembled perspective view of the portable electronic device shown in FIG. 1.

Referring to FIGS. 1, 2 and 4, when assembly the portable electronic device 100, the elastic sheet 143 is attached to the battery cover 50 with the elastic arm 131 aligned with the key hole 51. The key 11 passes through and is received within the key hole 51 of the battery cover 50. The resisting block 113 passes through the through hole 1311 of the elastic arm 131, exposed to the inner side of the battery cover 50. The two assembly posts 115 pass through and can be fixed within the corresponding two assembly holes 1313 by hot melt technology. The switch module 17 is assembled to the housing 40 with the switch 171 and the connecting sheet 173 passes through the guide hole 415 and is received within the assembly groove 411. The flexible printed circuit board 175 is accommodated within the assembly slot 43 of the housing 40. The protective cover 15 is then mounted to the connecting sheet 173 and covers the switch 171, with the hot melt posts 1515 passing through, and can be fixed within the corresponding hot melt holes 1731 by hot melt technology. The circuit board 30 is assembled within the assembly slot 43 and electrically connects with the flexible printed circuit board 175. The battery cover 50 is mounted to the housing 40, with the resisting block 113 of the key 11 abutting on the corresponding pressing portion 1531 of the protective cover 15, thus the portable electronic device 100 is assembled.

Figure 5:
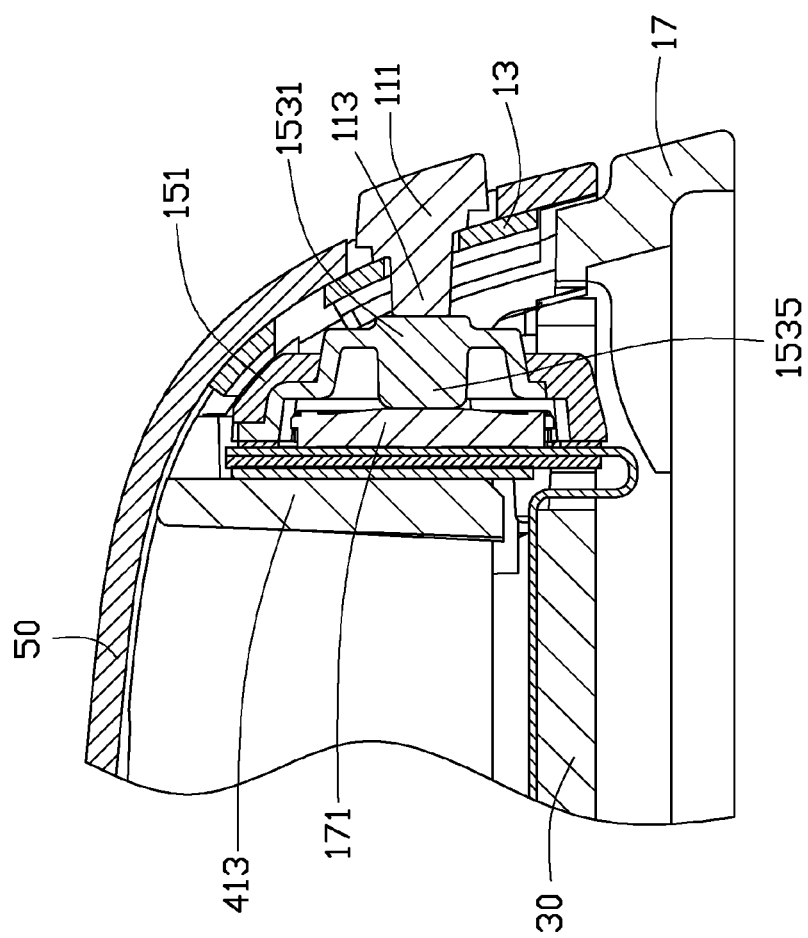
FIG. 5 is a sectional view taken along ling V-V of FIG. 4.

Also referring to FIGS. 4 and 5, in use, the key body 111 of the key 11 is pressed toward the switch module 17. The resisting block 113 together with the elastic arm 131 is moved toward the switch module 17, and the resisting block 113 jointly resists against the pressing portion 1531 to trigger the switch 171 to generate a special electric control circuit for controlling the portable electronic device 100. As the key body 111 of the key 11 is released, the elastic arm 131 together with the key 11 returns back to its original position.

It is to be understood, however, that even though numerous characteristics and advantages of the exemplary disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A key assembly, comprising:
a key comprising a. key body and a resisting block protruding from the key body;
a protective cover comprising a cover body and a pressing body, the cover body having an accommodating cavity recessed therefrom and an accommodating hole defined through a base wall of the accommodating cavity; the pressing body comprising a pressing portion and a resisting post protruding from the pressing portion, the pressing portion being received within the accommodating cavity, and exposed from the accommodating hole to resist against the corresponding resisting block of the key;
a switch covered under the protective cover and abutting against the corresponding resisting post; and
an elastic sheet mounted with the key, the elastic sheet comprising an elastic arm extending therefrom and a through hole defined through the elastic arm; the key fixed to the elastic arm with the resisting block of the key passing through the corresponding through hole and abutting against the pressing portion;
wherein when the key is pressed toward the switch, the resisting block together with the elastic arm is moved toward the switch to resist against the pressing portion for triggering the switch.

2. The key assembly as claimed in claim 1, wherein the key further includes two assembly posts protruding from the key body and aligning with the resisting block; the elastic arm further defines two assembly holes through the elastic arm corresponding to the two assembly posts; the two assembly posts are fixed into the corresponding two assembly holes of the elastic arm.

3. The key assembly as claimed in claim 2, wherein the cover body and the pressing body are integrally made by double-colored injection molding technology.

4. The key assembly as claimed in claim 2, wherein the pressing body further includes an accommodating chamber recessed from the pressing portion, the resisting post protruding from the bottom of the accommodating chamber.

5. The key assembly as claimed in claim 4, wherein the cover body includes at least one gap defined in the inner wall of the accommodating cavity; the pressing body further includes at least one lug protruding from the periphery of the pressing portion corresponding to the at least one gap of the cover body; the at least one lug latches into the corresponding at least one gap of the cover body.

6. The key assembly as claimed in claim 5, wherein the cover body includes two assembly posts protruding from a surface of the cover body and are symmetrically located at two sides of the accommodating cavity.

7. The key assembly as claimed in claim 6, wherein the cover body further includes at least one hot melt post protruding from the surface of the cover body and positioned at the same side of the cover body as the two assembly posts.

8. A portable electronic device, comprising:
 a housing;
 a battery cover detachably mounted to the housing and defining a key hole through the battery cover;
 a circuit board assembled within the housing; and
 a key assembly comprising:
  a key assembled to the battery cover and received within the key hole, the key comprising a key body and a resisting block protruding, from the key body;
  a switch module assembled to the housing corresponding to the key and electrically connecting with the circuit board, the switch module being configured to be triggered by the key; and
  a protective cover assembled to the housing for covering the switch module, the protective cover comprising a cover body and a pressing body, the cover body having an accommodating cavity recessed therefrom and an accommodating hole defined through a base wall of the accommodating cavity; the pressing body comprising a pressing portion and a resisting post protruding from the pressing portion, the pressing portion being received within the accommodating cavity and exposed from the accommodating hole;
  an elastic sheet mounted with the key, the elastic sheet comprising an elastic arm extending therefrom and a throe through hole defined through the elastic arm; the key fixed to the elastic arm with the resisting block of the key passing through the corresponding through hole and abutting against the pressing portion;
  wherein when the key is pressed toward the switch, the resisting block together with the elastic arm is moved toward the switch to resist against the pressing portion for triggering the switch to generate an electric control circuit for controlling the portable electronic device as the battery cover is mounted to the housing.

9. The portable electronic device as claimed in claim 8, wherein the housing includes a side wall and defines an assembling slot, the side wall includes an assembling groove recessed in the side wall, thereby forming a side groove wall, the switch module includes a switch and a flexible printed circuit board, the switch and the protective cover are assembled within the assembling groove, the flexible printed circuit board and the circuit are received within the assembling slot.

10. The portable electronic device as claimed in claim 8, wherein the switch module further includes a connecting sheet, the housing further includes a guiding hole defined through the bottom of the assembling groove and communicating with the assembling slot; the switch and the connecting sheet pass through the guiding hole and are received within the assembling groove.

11. The portable electronic device as claimed in claim 10, wherein the cover body includes at least one hot melt post, protruding from a surface of the cover body, the connecting sheet defines at least one hot melt hole through the connecting sheet, the at least one hot melt post passes through and is fixed to the hot melt hole by hot melt technology, such that, the protective cover and the switch module are fixed together.

* * * * *